United States Patent
Okayama et al.

(10) Patent No.: US 6,258,893 B1
(45) Date of Patent: Jul. 10, 2001

(54) UNORIENTED POLYPROPYLENE MOLDING

(75) Inventors: Chikashi Okayama; Takanori Nakashima; Yuya Ishimoto; Shinji Nakata, all of Ichihara; Yasuhiro Mochizuki, Chiba; Shinichi Akitaya; Yoshitaka Sumi, both of Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/424,001

(22) PCT Filed: May 11, 1998

(86) PCT No.: PCT/JP98/02071

§ 371 Date: Nov. 15, 1999

§ 102(e) Date: Nov. 15, 1999

(87) PCT Pub. No.: WO98/51732

PCT Pub. Date: Nov. 19, 1998

(30) Foreign Application Priority Data

May 15, 1997 (JP) ............................................. 9-125475

(51) Int. Cl.$^7$ ........................................................... C08I 8/00
(52) U.S. Cl. ............................................... 525/191; 525/240
(58) Field of Search ...................................... 525/191, 240

(56) References Cited

U.S. PATENT DOCUMENTS 4,822,840 * 4/1989 Kioka et al. ........................... 525/240
5,804,665 * 9/1998 Watanabe et al. .................... 525/323

FOREIGN PATENT DOCUMENTS

| 6-239918 | 8/1994 | (JP) . |
| 6313049 | 11/1994 | (JP) . |
| 8-027238 | 1/1996 | (JP) . |
| 8-217889 | 8/1996 | (JP) . |

OTHER PUBLICATIONS

Patent Abstracts of Japan, vol. 1996, No. 03, Mar. 29, 1996, (JP 07–309985).

* cited by examiner

*Primary Examiner*—Nathan M. Nutter
(74) *Attorney, Agent, or Firm*—Kilpatrick Stockholm LLP (57) ABSTRACT

An unoriented polypropylene-based film or sheet possessing excellent impact resistance at low temperature, transparency, heat resistance at low temperature and excellent tear strength and/or stress whitening resistance. A molding material which comprises a polypropylene-based resin material comprising 40 to 80% by weight of crystalline polypropylene and 60 to 20% by weight of propylene-α-olefin copolymer containing 20 to 80% by weight of propylene polymerization units, the propylene-α-olefin copolymer dispersed as particles in the crystalline polypropylene, is unoriently molded to afford a film-shaped or sheet-shaped molding, wherein the particle diameter have an aspect ratio (L/D) of mean dispersed particle length (L) to mean dispersed particle diameter along the thickness of the molding (D) of 30 or more in a cross section of the molding along the MD direction, and the mean dispersed particle diameter of 0.3 μm or less.

5 Claims, 3 Drawing Sheets

UNORIENTED POLYPROPYLENE MOLDING

TECHNICAL FIELD

The present invention relates to a film-shaped or sheet-shaped unoriented molding formed from a molding material comprising a polypropylene-based resin material. More precisely, it relates to an unoriented polypropylene-based film having excellent transparency, impact resistance at low temperature and heat resistance as well as excellent tear resistance, or to an unoriented polypropylene-based sheet having excellent transparency, impact resistance at low temperature and heat resistance as well as excellent stress whitening resistance against an impact such as a drop or a hit.

BACKGROUND ART

Films or sheets of polypropylene-based resins have such characteristics that those are inexpensive and have excellent chemical resistance, oil resistance, mechanical strength, transparency, and heat resistance. Accordingly, those are widely utilized as materials for packaging food, textiles, etc. and as food containers, industrial material parts or stationery such as files.

The conventional unoriented polypropylene-based resin films or sheets have excellent heat resistance, however, they are poor in impact resistance at low temperature and tear strength if a composition containing a homopolymer of a propylene is used for the unoriented polypropylene-based resin films or sheets. On the other hand, if a copolymer composition containing a propylene-α-olefin random copolymer is used therefor, though they have excellent transparency, their heat resistance and impact resistance at low temperature are poor. In addition, in case where a composition of a block copolymer consisting of a propylene homopolymer and a propylene-α-olefin copolymer is used therefor, impact resistance at low temperature is excellent, but there are such defects that transparency is low, tear strength is poor, whitening due to impacts such as a drop or a hit is remarkable.

Therefore, in the conventional unoriented films or sheets using a polypropylene, it has not been easy to obtain ones satisfying all of transparency, impact resistance at low temperature and heat resistance, while possessing excellent tear strength and/or stress whitening resistance against impact (property that is not liable to be white due to impact).

DISCLOSURE OF THE INVENTION

An object of the present invention is to provide an unoriented polypropylene-based film or sheet having excellent transparency and heat resistance as well as excellent tear strength and/or stress whitening resistance, without deteriorating impact resistance at low temperature.

The present inventors earnestly conducted studies in order to achieve the foregoing object. As a result, they found that, in an unoriented molding composed of a polypropylene-based material comprising a propylene-α-olefin copolymer is dispersed as particles in crystalline polypropylene, transparency and heat resistance are improved without the deterioration of impact resistance at low temperature, and in addition, tear strength and stress whitening resistance can also be improved by controlling the copolymer particles so as to have a specific dispersion state in a cross-section along an MD direction of the molding. Thus, they have accomplished the present invention.

That is, the present invention provides an unoriented polypropylene-based molding which is a film-shaped or sheet-shaped molding formed from a molding material comprising a polypropylene-based resin material, the material comprising 40 to 80% by weight of crystalline polypropylene and 60 to 20% by weight of propylene-α-olefin copolymer containing 20 to 80% by weight of propylene polymerization units, the propylene-α-olefin copolymer dispersed as particles in the crystalline polypropylene, wherein the particles of the copolymer have an aspect ratio (L/D) of mean dispersed particle length (L) to mean dispersed particle diameter along the thickness of the molding (D) of 30 or more in a cross section of the molding along the MD direction, and the mean dispersed particle diameter of 0.3 μm or less.

The unoriented molding having the above characteristics in form is preferably that a ratio of MFR of the crystalline polypropylene to that of the propylene-α-olefin copolymer (MFR of the crystalline polypropylene/MFR of the propylene-α-olefin copolymer) is 10 or less.

The above-mentioned unoriented polypropylene-based molding is preferably an unoriented film having a thickness of 10 to less than 100 4 μm.

The above-mentioned unoriented polypropylene-based molding is preferably a sheet having a thickness of 0.1 to 4 mm.

The unoriented molding of the present invention comprises the elongated copolymer particles dispersed in a matrix of the crystalline polypropylene in such a manner the particles should have an aspect ratio higher than a certain level, and an unoriented film of sheets having such a dispersion state has been made by the present invention for the first time.

According to the present invention, an unoriented film having excellent impact resistance at low temperature, transparency, heat resistance and tear strength can be obtained thanks to such characteristics in form.

Further, according to the present invention, a sheet having excellent impact resistance at low temperature, transparency, heat resistance and stress whitening resistance can be obtained thanks to such characteristics in form.

The unoriented film of the present invention is useful as a film for package, in particular, as a film for food package (for example, for packaging retort foods or for packaging frozen foods) that requires transparency as well as impact resistance at low temperature, heat resistance and tear strength.

Further, the sheet of the present invention is useful as sheets for stationary such as files, or industrial material parts, in particular, as sheets for food packaging containers, sheets for industrial material parts or the like (for example, sheets for cosmetic papers, sheets for civil engineering) that particularly requires transparency as well as stress whitening resistance and impact resistance at low temperature.

Preferred embodiments of the present invention will be explained hereinafter.

(1) Polypropylene-based Resin Material of the Present Invention

The molding material for forming the unoriented molding of the present invention comprises a polypropylene-based resin material that consists of crystalline polypropylene and propylene-α-olefin copolymer, the copolymer being dispersed as particles in the crystalline polypropylene (the copolymer is dispersed as domains in a matrix of the crystalline polypropylene).

(i) Crystalline Polypropylene

The crystalline polypropylene used for the present invention is a crystalline polymer comprising principally of propylene units, and preferably comprises 90% by weight or more of the propylene units based on the whole polymer. Specifically, it may be a homopolymer of propylene, or it may be a random copolymer comprising 90% by weight or more of propylene units and less than 10% by weight of α-olefin. When it is a copolymer, the α-olefin may include ethylene, 1-butene, 1-pentene, 1-hexene, 1-octene, 1-decene, 1-dodecene, 4-methyl-1-pentene, 3-methyl-1-pentene, and the like. It is preferable in view of the production cost to use a propylene homopolymer or propylene-ethylene random copolymer having a propylene unit content of 90% by weight or more.

The melt flow rate (abbreviated as "MFR" hereinafter) of the crystalline polypropylene is preferably in the range of 0.1–50 g/10 minutes in view of the stability upon film-forming.

(ii) Propylene-α-olefin Copolymer

The propylene-α-olefin copolymer used for the present invention is a random copolymer of propylene and an α-olefin other than propylene. The content of propylene unit is preferably in the range of 20–80% by weight, more preferably 20–75% by weight, particularly preferably 20–70% by weight based on the whole copolymer. When the content of propylene unit exceeds 80%, the desired dispersed state of the copolymer particles (referred to as "copolymer domains" hereinafter) in the matrix of crystalline polypropylene may not be obtained, and it is not practically preferable in the point that improvement effect of impact resistance at low temperature and tear strength, which is the purpose of the present invention, are not sufficiently obtained. On the other hand, when it is less than 20% by weight, the copolymer domains purposed in the present invention are difficult to be formed, and it is not practically preferable in the point that impact resistance at low temperature and transparency are not sufficiently exhibited.

As the α-olefin other than propylene, ethylene, 1-butene, 1-pentene, 1-hexene, 1-octene, 1-decene, 1-dodecene, 4-methyl-1-pentene, 3-methyl-1-pentene and the like can be mentioned. Among these, a propylene-ethylene copolymer containing ethylene as the α-olefin is preferably used because it is beneficial to the production cost.

While MFR of the propylene-α-olefin copolymer used for the present invention is not particularly limited, it is preferably in the range of 0.1–20 g/10 minutes.

More preferably, MFR of the propylene-α-olefin copolymer is preferably selected so that its ratio to MFR of the crystalline polypropylene (MFR of the crystalline polypropylene/MFR of the propylene-α-olefin copolymer, referred to as "MFR ratio" hereinafter) should be 10 or less, more preferably in a range of 0.1–5.

(iii) Polypropylene-based Resin Material

In the polypropylene-based resin material of the present invention, the content of the crystalline polypropylene is 40–80% by weight, preferably 50–80% by weight, and the content of the propylene-α-olefin copolymer is 60–20% by weight, preferably 50–20% by weight based on the whole polypropylene-based resin material. When the ratio of the copolymer is less than 20% by weight, sufficient impact resistance at low temperature and tear strength cannot be obtained. When it exceeds 60% by weight, the rigidity of the film is markedly decreased, and it is not preferred for practical use.

The production method of the polypropylene-based resin material is not particularly limited, and it can be obtained by any kind of method. For example, it can be obtained by mixing crystalline polypropylene and propylene-α-olefin copolymer, which were polymerized separately, through melt-kneading or the like. Alternatively, it can be obtained by continuously polymerizing crystalline polypropylene and propylene-α-olefin copolymer by multi-step polymerization.

Specifically, a method based on melt-kneading of propylene-α-olefin copolymer polymerized by using a Ziegler-Natta catalyst such as a titanium-supported catalyst or a commercially available ethylene-propylene rubber and crystalline polypropylene can be exemplified. As the method for continuously polymerizing crystalline polypropylene and propylene-α-olefin copolymer by multi-step polymerization, for example, a method comprising producing propylene homopolymer in the first step, and producing propylene-α-olefin copolymer in the second step by utilizing a plurality of polymerization reactions can be exemplified. This continuous polymerization method is preferred, because it can be performed at a lower cost compared with the aforementioned melt-mixing method, and can produce a polypropylene-based resin material where the propylene-α-olefin copolymer is uniformly dispersed in the crystalline polypropylene, and it is suitable for stably realizing the desired quality (good transparency and tear strength).

As the polypropylene-based resin material of the present invention, particularly preferred are those produced by the aforementioned continuous polymerization method so that the resulting material should have the MFR ratio of the crystalline polypropylene and the propylene-α-olefin copolymer (MFR of the crystalline polypropylene/MFR of the propylene-α-olefin copolymer) of 10 or less, more preferably in the range of 0.1–5. By selecting the MFR ratio in the aforementioned range, the propylene-α-olefin copolymer can be uniformly and finely dispersed in the crystalline polypropylene, and the copolymer particles can have elongated form with an aspect ratio higher than a certain level. This provide a polypropylene-based unoriented molding (film or sheet) having good transparency and excellent tear strength and/or stress whitening resistance.

Specifically, polypropylene-based resin materials having such an MFR ratio can be produced by the methods mentioned in Japanese Patent Unexamined Publication Nos. 6-239918, 8-27238, and the like.

The MFR ratio can usually be calculated by measuring the MFR of the crystalline polypropylene and the propylene-α-olefin copolymer respectively, but when the polypropylene-based resin material is continuously produced by the multi-step polymerization method (the crystalline polypropylene is polymerized first, and then the propylene-α-olefin copolymer is polymerized), the MFR of the propylene-α-olefin copolymer cannot be directly measured. In such a case, the MFR of the propylene-α-olefin copolymer can be obtained from the MFR of the crystalline polypropylene, which can be directly measured, the MFR of the obtained polypropylene-based resin material, and the content of the propylene-α-olefin copolymer in the polypropylene-based resin material according to the following equation:

$$\log(MFR_{RC}) = \frac{\log(MFR_{whole}) - (1 - W_{RC}/100)\log(MFR_{PP})}{W_{RC}/100}$$

$MFR_{RC}$: MFR of propylene-α-olefin copolymer
$MFR_{whole}$: MFR of polypropylene-based resin material
$MFR_{PP}$: MFR of crystalline polypropylene
$W_{RC}$: Content of propylene-α-olefin copolymer in polypropylene-based resin material (2) Molding Material of the Present Invention While the molding material of the present invention is mainly composed of the aforementioned polypropylene-based resin material, it may further contain additives conventionally used for polyolefine-based film materials, for example, antioxidant, neutralizer, light stabilizer, inorganic filler, lubricant, anti-blocking agents, antistatic agent and the like.

Examples of the antioxidant include, for example, phenolic antioxidants such as tetrakis[methylene-(3,5-di-t-butyl-4-hydroxyphenyl)propionate]methane, 2,6-di-t-butyl-4-methylphenol, n-octadecyl-3-(3',5'-di-t-butyl-4'-hydroxyphenyl)propionate, and tris(3,5-di-t-butyl-4-hydroxybenzyl) isocyanurate; phosphorus-containing antioxidants such as tris(2,4-di-t-butylphenyl) phosphite, tris(nonylphenyl) phosphite, distearylpentaerythritol diphosphite, and tetrakis(2,4-di-t-butylphenyl)-4,4'-biphenylenediphosphonite, and the like.

Examples of the neutralizer include, for example, salts of higher fatty acid such as calcium stearate. Examples of the inorganic filler and the anti-blocking agents include, for example, calcium carbonate, silica, hydrotalcite, zeolite, aluminum silicate, magnesium silicate and the like. Examples of the lubricant include, for example, higher fatty acid amides such as stearic acid amide and the like; and examples of the antistatic agents include, for example, fatty acid esters such as glycerin monostearate and the like.

While the amounts of these additives may be suitably selected depending on the intended use of the molding (film or sheet), they are preferably used in an amount of about 0.001–5% by weight based on the whole molding material in general. Further, in the sheet, it is preferable that the contents of the inorganic fillers are 0.001–75% by weight, the contents of synthetic rubbers are 0.5–60% by weight and the contents of other additives are generally about 0.001–5% by weight.

The method for mixing the polypropylene-based resin material and the aforementioned additives is not particularly limited, and it can be performed, for example, by mixing methods utilizing conventional mixing apparatuses including mixers provided with high-speed agitators such as Henschel mixer (trade name), ribbon blender and tumbler mixer and the like (dry blend), as well as methods for pelletization utilizing a conventional single-screw extruder, twin-screw extruder and the like.

(3) Molding of the Molding Material

Of the moldings of the present invention, the unoriented film is obtained by extrusion molding the above-mentioned molding material with the conventional method. For example, it can be produced by T-die cast method, water cooling inflation method or the like.

The sheet of the present invention can be produced by the known extrusion molding, calender molding, cast molding or the like. Of the conventional molding methods, the extrusion molding is preferable in the point of productivity. Specifically, the T-die method using an apparatus (T-die sheet molding machine) having steps of extruder, T-die, polishing roll (cooling roll), guide roll, take-up roll, trimming cutter, masking, constant-length cutter, stacker and the like is further preferable.

The resin temperature in molding the sheet is preferably 180–300° C. If the resin temperature is 180° C. or higher, the polypropylene-based resin material is sufficiently melted, and the sheet surface does not show a rough-skinned state but shows good appearance. Further, if the resin temperature is 300° C. or lower, heat deterioration of the polypropylene-based resin material due to heat is hardly occurred, melt tension of the sheet can be maintained and thus good moldability is obtained.

The cooling roll temperature in molding the sheet is preferably 5–80° C. If the cooling roll temperature is 5° C. or higher, the cooling roll does not cause dew condensation, and as a result, spot-like pattern is not formed on the sheet surface and good surface appearance can be obtained. Further, if the cooling roll temperature is 80° C. or lower, the sheet can sufficiently be cooled, and as a result, a linear pattern formed in unwinding a rolled sheet is not formed and good surface appearance can be obtained.

The molding speed of the sheet is preferably about 0.1–100 m/min. If the molding speed is 0.1 m/min or more, a sheet having uniform thickness can be obtained and fraction defective is small. If the molding speed is 100 m/min or less, the sheet is sufficiently cooled, and as a result, a linear pattern formed in unwinding a rolled sheet is not formed and good surface appearance can be obtained.

(4) Unoriented Polypropylene-based Molding

In the film-shaped or sheet-shaped unoriented polypropylene-based molding of the present invention, the propylene-α-olefin copolymer domains dispersed as particles in the crystalline polypropylene have a mean dispersed particle diameter along the film thickness direction of 0.3 $\mu$m or less, preferably 0.2 $\mu$m or less in a cross section along the MD direction. When the mean dispersed particle diameter is more than 0.3 $\mu$m, the transparency is degraded. On the other hand, the lower limit of the mean dispersed particle diameter is not particularly defined, and it may be however small so long as the copolymer domains can be observed. However, the mean dispersed particle diameter is preferably not less than 0.02 $\mu$m.

The molding of the present invention is also characterized by the aspect ratio (L/D) of 30 or more, preferably 50 or more, as for the ratio of the mean dispersed particle length (L) to the aforementioned mean dispersed particle diameter (D) of the copolymer domains in a cross section along the MD direction.

Figure 1:
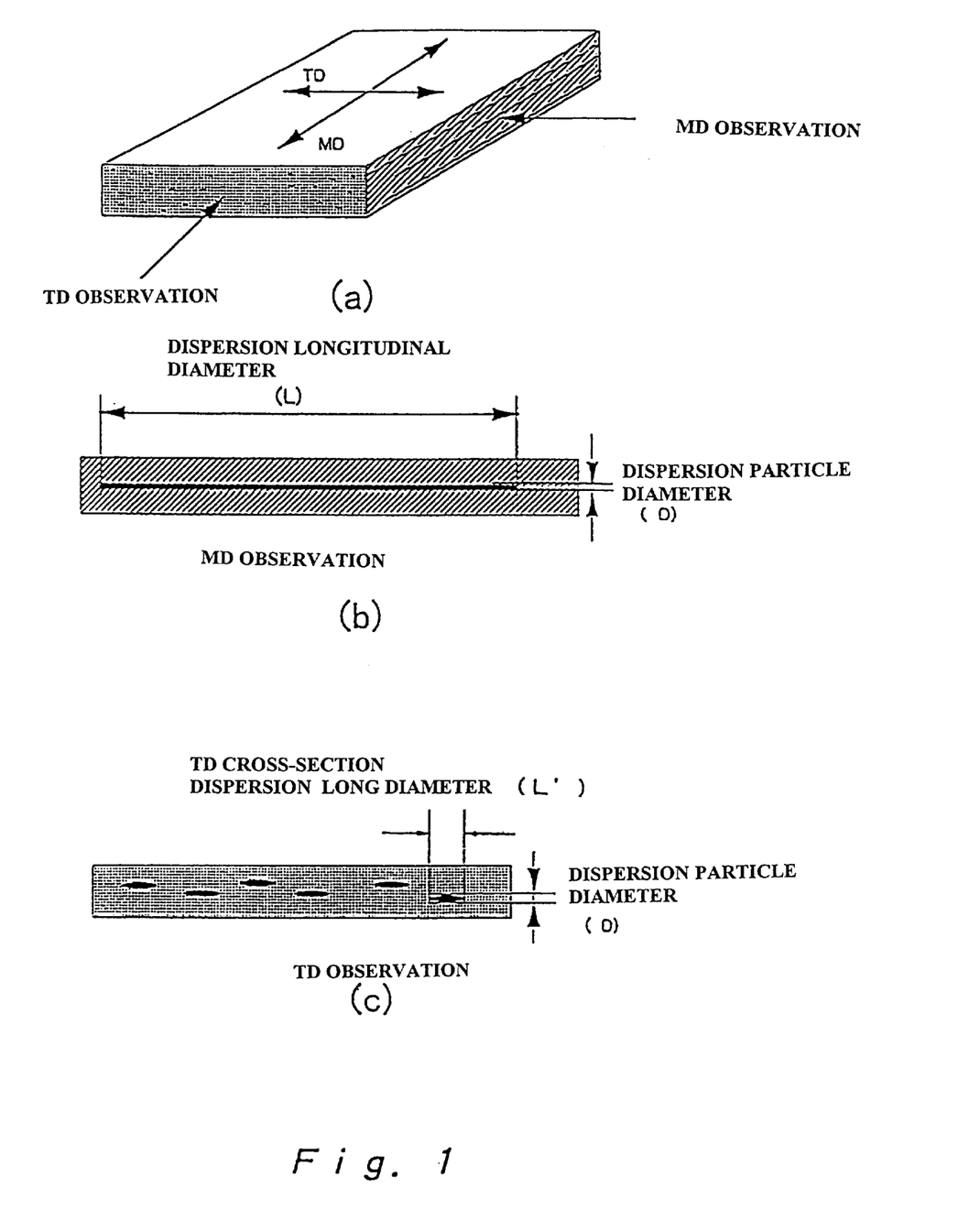
FIG. 1 includes schematic views representing the relationship between the mean dispersed particle length (L) and the mean dispersed particle diameter (D) in a cross section along the MD direction.

The relationship between the mean dispersed length (L) and the mean dispersed particle diameter (D) is schematically shown in FIG. 1(a) and (b). The mean dispersed particle diameter (D) in a cross section along the MD direction is the average of the particle diameter (breadth) of the dispersed particles along the molding thickness direction when the cross section of the film or the sheet along the MD direction is observed from the perpendicular direction to the MD direction (MD observation: edge view). The mean dispersed length (L) is the average of the length of the dispersed particles in the aforementioned MD observation.

According to the present invention, such fine and elongated copolymer domains are uniformly dispersed in the matrix. This provides an unoriented film or sheet having excellent tear strength and/or stress whitening resistance as well as excellent transparency. The aspect ratio of less than 30 is not preferred, because the film or the sheet with such an aspect ratio may degrade the tear strength and/or stress whitening resistance and transparency also be lowers.

Although the upper limit of the aspect ratio is not particularly limited, it is preferably about 500 when a length of one copolymer particle is regarded as the particle diameter along the MD direction of the copolymer domain. However, there is the case that the copolymer particles may be fused and mutually connect along the MD direction and a plurality of copolymer particles are united to form a single copolymer domain. In this case, when the multiple fused copolymer particles is considered as one copolymer domain, the particle diameter along the MD direction may be several times as large as the length of one copolymer particle. The maximum aspect ratio of such a copolymer domain in such a case may be several times that of one copolymer domain composed of one copolymer particle as mentioned above, specifically 10 to 50 times, and the aspect ratio may reach as high as around 300 to 1,500.

When a cross section along the TD direction of the molding of the present invention is observed from the perpendicular direction to the TD direction (TD observation: end view), the copolymer domains may be a flat shape in molding. In such a case, the aspect ratio (L'/D) of the mean dispersed length (L') to the mean dispersed particle diameter (D) along the thickness direction of the molding in the cross section along the TD direction is preferably, while it is not particularly limited, about 1 to about 10. The TD observation is schematically shown in FIG. 1(c).

According to the present invention, it was found for the first time that a film-shaped or sheet-shaped unoriented molding containing the copolymer domains which exhibited such a fine mean dispersed particle diameter and such an aspect ratio as described above has excellent transparency, impact resistance at low temperature and heat resistance as well as excellent tear strength and stress whitening resistance. Therefore, the molding may be a film or sheet obtained by any kind of method so long as the film or sheet satisfies the requirements concerning the particle diameter of the copolymer domains. Specifically, the unoriented film or sheet satisfying the requirements can be obtained by extrusion molding a polypropylene-based resin material produced by the above-mentioned continuous polymerization method.

The thickness of the unoriented polypropylene-based film of the present invention is preferably 10 µm to less than 100 µm, more preferably 15 to 70 µm, in view of the moldability of the film.

The thickness of the unoriented polypropylene-based sheet of the present invention is preferably 0.07 to 4 mm, more preferably 0.1 to 4 mm, and particularly preferably 0.1 to 3 mm, in view of the moldability of the sheet.

The unoriented polypropylene-based film of the present invention has excellent cold resistance at low temperature as well as excellent tear strength, and also maintains transparency and heat resistance. Therefore, it can be preferably used as, for example, materials for packaging vegetables, for packaging breads, for packaging frozen food, or the like.

The unoriented polypropylene-based sheet of the present invention has excellent cold resistance at low temperature (impact resistance at low temperature) as well as stress whitening resistance and transparency, and maintains heat resistance. Therefore, it can be preferably used as stationary such as files and industrial materials such as food packaging material or cosmetic paper.

The film-shaped or sheet-shaped unoriented polypropylene-based molding of the present invention can also be used for a multilayer film or a multilayer sheet comprising two or more layers, which can be prepared by laminating one or more films or sheets made of other resins on one or both sides of the molding of the present invention. The other resins used in such a case are not particularly limited, and various resins can be used depending on the purpose. For example, when a layer composed of heat adhesive resin such as propylene-α-olefin copolymer having a low melting point is provided on the unoriented molding of the present invention, it can be used as various packaging materials. An in-line laminating method, a co-extrusion method and the like, which are performed during the production stage of a film or sheet, a dry laminating method or the like in which lamination is performed after production of a film or sheet, can be applied to the method for producing such a multilayer film or multilayer sheet.

The unoriented polypropylene-based molding or multilayer film or multilayer sheet of the present invention can be subjected to surface treatment such as corona discharge treatment, flame treatment or plasma treatment according to a general method industrially employed for the purpose of imparting printability, lamination characteristic, metal deposition characteristic or the like.

BRIEF EXPLANATION OF THE DRAWINGS

FIG. 1(a) is a perspective view of the film-shaped or sheet-shaped molding, FIG. 1(b) is a view of the MD observation representing a cross section along the MD direction, and FIG. 1(c) is a view of the TD observation representing a cross section along the TD direction.

BEST MODE FOR CARRYING OUT THE INVENTION

The present invention will be further explained more specifically hereinafter with reference to the following examples, but the present invention is not limited by these examples.

EXAMPLES 1–5 AND COMPARATIVE EXAMPLES 1–3

(1) Production of Molding Materials 0.03% by weight of tetrakis[methylene-(3,5-di-t-butyl-4-hydroxyphenyl)propionate]methane as a phenolic antioxidant, 0.08% by weight of tris(2,4-di-t-butylphenyl) phosphite as a phosphorus-containing antioxidant, 0.1% by weight of calcium stearate as a neutralizer, 0.2% by weight of silica as an anti-blocking agent and 0.1% by weight of oleic acid amide as a lubricant include, based on the whole weight of the molding materials, were blended with polypropylene-based resin materials as shown in Table 1. These were blended by a Henschel mixer (trade name), melt-kneaded and pelletized by a single-screw extruder (aperture of 40 mm diameter) to obtain a molding material.

The polypropylene-based resin materials used in these examples were obtained by the continuous polymerization method where crystalline polypropylene was polymerized in the first step, and propylene-α-olefin copolymer (propylene-ethylene copolymer) was polymerized in the second step.

The values of MFR of the polypropylene-based resin materials and that of the crystalline polypropylenes, both shown in Table 1, were determined according to JIS-K-7210 under the conditions of test temperature of 230° C. and test load of 21.18 N.

(2) Production of Unoriented Films

The pellets obtained in the above pelletization were melt-extruded at 230° C. using a single layer extruder (aperture of 65 mm diameter) equipped with a T-die and cooled and solidified by an air chamber and cooling roller having a surface temperature of 30° C. to obtain an unoriented film having a thickness of 25 4m.

(3) Evaluation

Various physical property values of the obtained unoriented film, i.e., mean dispersed particle diameter and aspect ratio in the cross section along MD direction of a copolymer domain in the film, a transparency (haze) of the film, a impact resistance, a heat resistance, and a tear strength along the TD direction, are shown in Table 1. Evaluation methods of these physical property values are as follows.

(a) Dispersed Particle Diameter and Aspect Ratio in Cross Section Along MD Direction of Copolymer Domains An unoriented film was cut along the parallel directions to the MD direction, dyed in vapor phase with a ruthenium compound ($RuO_4$) for 48 hours, and then cut into pieces having a thickness of about 100 nm with a diamond knife using an ultramicrotome to prepare ultrathin sections. The obtained ultrathin sections were observed by using a transmission electron microscope (tradename: JEOLJEM 100CX) at a magnification of 5,000, each of mean dispersed particle diameter of the copolymer domains along the MD direction and mean dispersed particle length along the TD was obtained through statistical processing of the electron microscope photograph, and aspect ratio was calculated from them.

(b) Tear Strength (TD direction)

Elemendorf tear strength of an unoriented film was measured according to ASTM D-1922. The larger value means that the film is hardly to tear.

(c) Haze

Haze of an unoriented film (unit: %) was measured according to ASTM-D-1003, and used as a parameter of transparency. A smaller value indicates better transparency.

(d) Impact Resistance

An unoriented film was leaved in a thermostat set to a predetermined temperature for 15 minutes, and a shock strength was measured according to ASTM-D-781. The temperature at which the strength became 0.5 J or less was used as an index of the impact resistance at low temperature. A lower temperature means that the shock residence of the film is better.

(e) Heat Resistance

A rectangular sample of 10×100 mm, cut from an unoriented film, was dipped in a silicone oil bath set to a predetermined temperature and leaved therein for 10 minutes. A length along longitudinal direction of the sample was measured and a temperature at which a value expressed in percentage of the shrunk length to an initial length exceeds 2% was used as an index of the heat resistance. A higher temperature means that the heat resistance of the film is better.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| (1) Polypropylene-based resin | | | | | | | | |
| Crystalline polypropylene content (wt %) | 70.8 | 75 | 62.2 | 71.1 | 67 | 70.8 | 70.3 | 82.3 |
| Propylene content in crystalline polypropylene (wt %) | 100 | 100 | 100 | 99.7*[1] | 100 | 100 | 100 | 100 |
| Copolymer*[2] content (wt %) | 29.2 | 25 | 37.8 | 28.9 | 33 | 29.2 | 29.7 | 17.7 |
| Propylene content in copolymer (wt %) | 66 | 64 | 67 | 65 | 63 | 64 | 82 | 66 |
| MFR of polypropylene-based resin (g/10 min) | 6 | 6.2 | 6.5 | 4 | 3 | 6.2 | 6.2 | 6.2 |
| MFR of crystalline polypropylene (g/10 min) | 7.2 | 6.2 | 6.5 | 2.8 | 3 | 34 | 6.2 | 6.2 |
| MFR ratio*[3] | 1.7 | 1 | 1 | 0.26 | 1 | 82.9 | 1 | 1 |
| (2) Various physical properties of film | | | | | | | | |
| Mean dispersed particle diameter of copolymer (μm) | 0.13 | 0.11 | 0.11 | 0.1 | 0.11 | 1.3 | 0.08 | 0.11 |
| Aspect ratio of copolymer (L/D) | >50 | >50 | >50 | >50 | >50 | <2 | >50 | >50 |
| Haze (%) | 9.1 | 2 | 5.8 | 5.5 | 8.2 | 31.7 | 1.8 | 1.8 |
| Impact resistance at low temperature (° C.) | −20 | −20 | −20 | −25 | −25 | −25 | −5 | 0 |
| Heat resistance (° C.) | 130 | 135 | 120 | 130 | 130 | 130 | 130 | 140 |
| Tear strength along TD direction (N/mm) | 24 | 26 | 60 | 51 | 27 | 11 | 8 | 9 |

Figure 2:
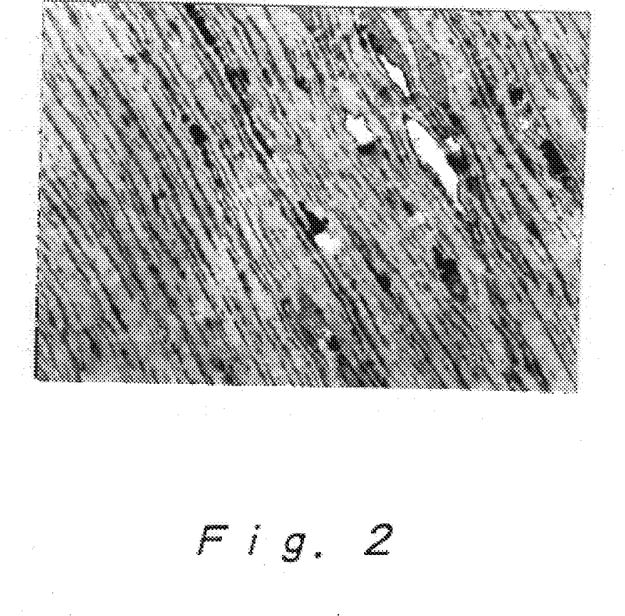
FIG. 2 is an electron microscope photograph (magnification: ×5000) which shows the particle state of copolymer domains along the MD direction in the unoriented film obtained in Example 2.
Figure 3:
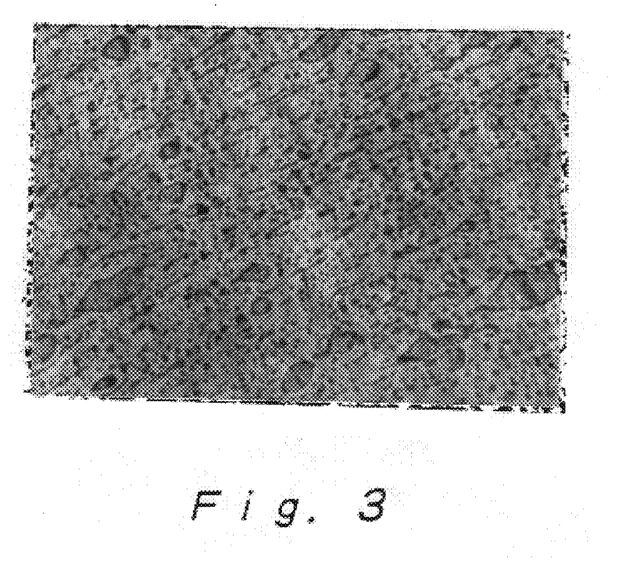
FIG. 3 is an electron microscope photograph (magnification: ×5000) which shows the particle state of copolymer domains along the TD direction in the unoriented film obtained in Example 2.

*[1]Propylene/ethylene copolymer
*[2]Propylene/ethylene copolymer
*[3]MFR ratio = MFR of crystalline PP/MFR of copolymer The electron microscope photograph (magnification: ×5000) of the ultrathin section, used for obtaining the mean dispersed particle diameter and the mean dispersed particle length of the copolymer domains in a cross section along the MD direction of the unoriented film obtained in Example 2, was shown in FIG. 2. FIG. 2 shows a photograph of the surface cut along the perpendicular direction to the MD direction of the ultrathin section. An electron microscope photograph in the case that the ultrathin section is cut along the perpendicular direction to the TD direction is shown in FIG. 3. FIG. 2 and FIG. 3 show electron microscope photographs representing particle state of the copolymer domains in the aforementioned film along the MD and TD directions, respectively.

As seen from the results shown in Table 1, the films of Examples 1–5 have excellent impact resistance at low temperature, heat resistance, and transparency and high tear strength. Moreover, as seen from FIGS. 2 and 3, the unoriented film of the present invention has a elongated copolymer domains dispersed finely and uniformly.

On the other hand, in Comparative Example 1, the mean dispersed particle diameter of the propylene-α-olefin copolymer is too large and the aspect ratio is low, so that only a film having poor transparency and low tear strength is obtained. In Comparative Example 2, the propylene content in the propylene-α-olefin copolymer in the polypropylene-based resin material is large, and in Comparative Example 3, the proportion of the propylene-α-olefin copolymer to the polypropylene-based resin material is small. Therefore, in Comparative Examples 2 and 3, only films having insufficient impact resistance at low temperature and low tear strength is obtained.

EXAMPLES 6–11 AND COMPARATIVE EXAMPLES 4–7

(1) Production of Molding Materials 0.03% by weight of Tetrakis[methylene-(3,5-di-t-butyl-4-hydroxyphenyl)propionate]methane as a phenolic antioxidant, 0.08% by weight of tris(2,4-di-t-butylphenyl) phosphite as a phosphorus-containing antioxidant, and 0.1% by weight of calcium stearate as a neutralizer, based on the whole weight of the molding materials, were blended with polypropylene-based resin materials as shown in Table 2. These were blended by a Henschel mixer (trade name), melt-kneaded and pelletized by a single screw extruder (aperture of 40 mm diameter) to obtain a sheet molding material.

The polypropylene-based resin materials used in these examples were obtained by the continuous polymerization method where crystalline polypropylene was polymerized in the first step, and propylene-α-olefin copolymer (propylene-ethylene copolymer) was polymerized in the second step.

The values of MFR of the polypropylene-based resin materials and that of the crystalline polypropylenes, both shown in Table 2, were determined according to JIS-K-7210 under conditions of test temperature of 230° C. and test load of 21.18 N.

(2) Production of Sheets

The pellets obtained in the above pelletization were molded by a T-die method using a sheet molding apparatus having a T-die and a polishing roll at an extrusion temperature of 230° C., a cooling roll temperature of 50° C. and a molding speed of 2 mm/min to obtain a sheet having a thickness of 0.6 mm.

(3) Evaluation

Various physical property values of the obtained sheet, i.e., mean dispersed particle diameter and aspect ratio in the cross section along the MD direction of a copolymer domain in the sheet, a transparency (haze) of the sheet, a impact resistance, a heat resistance and a stress whitening resistance, are shown in Table 2. Evaluation methods of those physical property values are as follows.

(a) Dispersed Particle Diameter and Aspect Ratio in Cross Section Along the MD Direction of Copolymer Domains A sheet was cut along at the parallel directions to the MD direction, dyed in vapor phase with a ruthenium compound ($RuO_4$) for 48 hours, and then cut into pieces having a thickness of about 100 nm with a diamond knife using an ultramicrotome to prepare ultrathin sections. The obtained ultrathin sections were observed by using a transmission electron microscope (trade name: JEOLJEM 100CX) at a magnification of 5,000, each of mean dispersed particle diameter of the copolymer domains along the MD direction and mean dispersed particle lengths along the TD direction was obtained through statistical processing of the electron microscope photograph, and aspect ratio was calculated from them.

(b) Haze

Haze of a sheet (unit: %) was measured according to ASTM-D-1003, and used as a parameter of transparency. A smaller value indicates better transparency.

(c) Heat Resistance

Vicat softening temperature was measured according to JIS-K7206, used as an index of heat resistance. A larger value indicates better heat resistance.

(d) Impact Resistance

Impact resistance in punching-out of a sheet at −20° C. was measured according to ASTM-D-781.

(e) Stress Whitening Resistance

A sheet was cut into a size having a width of 10 mm and a length of 120 mm, and this was used as a test piece. Both ends of this test piece were bent so as to gradually approach with each other. Bending the test piece was continued until the curved portion of the test piece became white. The curvature at the curved portion when the curved portion started to be white was determined, and the value of a diameter of a circle corresponding to this curvature was used as an index of the stress whitening resistance. A smaller value indicates better stress whitening resistance.

TABLE 2

|  | Example | | | | | | Comparative Example | | | |
| --- | --- | --- | --- | --- | --- | --- | --- | --- | --- | --- |
|  | 6 | 7 | 8 | 9 | 10 | 11 | 4 | 5 | 6 | 7 |
| (1) Polypropylene-based resin | | | | | | | | | | |
| Crystalline polypropylene content (wt %) | 68 | 76.9 | 72.2 | 67 | 67 | 56 | 75.6 | 85.5 | 66.5 | 85.5 |
| Propylene content in crystalline polypropylene (wt %) | 100 | 100 | 100 | 99.7*[1] | 100 | 100 | 100 | 98.8 | 100 | 100 |
| Copolymer*[2] content (wt %) | 32 | 23.1 | 27.8 | 33 | 33 | 44 | 24.4 | 14.5 | 33.5 | 14.5 |
| Propylene content in copolymer (wt %) | 63 | 60 | 64 | 62 | 55 | 64 | 54 | 62 | 55 | 66 |
| MFR of polypropylene-based resin (g/10 min) | 0.84 | 3.4 | 1.7 | 3.1 | 8 | 0.7 | 2.7 | 2.1 | 2.3 | 3.2 |
| MFR of crystalline polypropylene (g/10 min) | 0.7 | 5 | 1.7 | 3.1 | 11.5 | 0.7 | 5.3 | 6.1 | 7.9 | 3.2 |

TABLE 2-continued

|  | Example | | | | | | Comparative Example | | | |
| --- | --- | --- | --- | --- | --- | --- | --- | --- | --- | --- |
|  | 6 | 7 | 8 | 9 | 10 | 11 | 4 | 5 | 6 | 7 |
| MFR ratio*[3] | 0.57 | 2 | 1 | 1 | 3 | 1 | 17.7 | 1500 | 39.4 | 1 |
| (2) Various physical properties of film | | | | | | | | | | |
| Mean dispersed particle diameter of copolymer (μm) | 0.12 | 0.15 | 0.13 | 0.14 | 0.16 | 0.13 | 1.3 | 1.5 | 1.5 | 0.14 |
| Aspect ratio of copolymer (L/D) | >50 | >50 | >50 | >50 | >50 | >50 | <2 | <2 | <2 | >50 |
| Haze (%) | 47 | 45 | 47 | 47 | 58 | 60 | 95 | 93 | 95 | 60 |
| Vicat softening temperature (° C.) | 114 | 140 | 128 | 116 | 118 | 105 | 137 | 156 | 118 | 154 |
| Impact resistance in punching (−20° C.) (J) | >3 | >3 | >3 | >3 | >3 | >3 | >3 | >3 | >3 | <1 |
| Stress Whitening resistance (diameter of circle of curvature) (mm diameter) | <3 | <3 | <3 | <3 | <3 | <3 | 20 | 25 | 25 | 15 |

Figure 4:
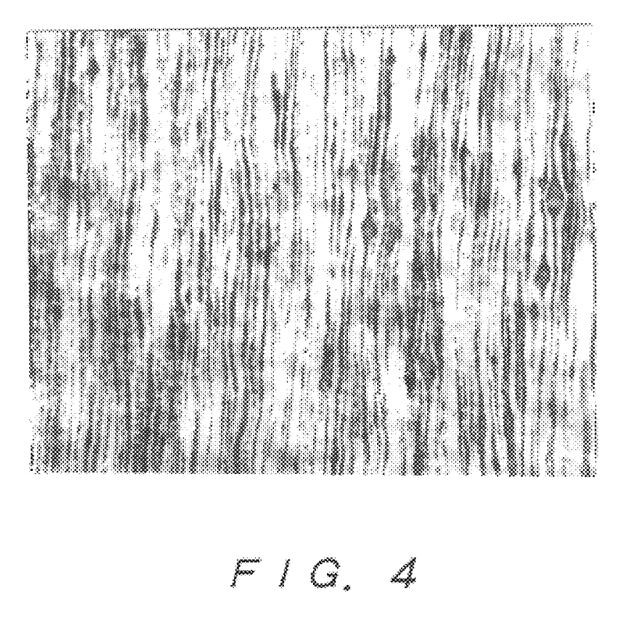
FIG. 4 is an electron microscope photograph (magnification: ×5000) which shows the particle state of copolymer domains along the MD direction in the sheet obtained in Example 7.
Figure 5:
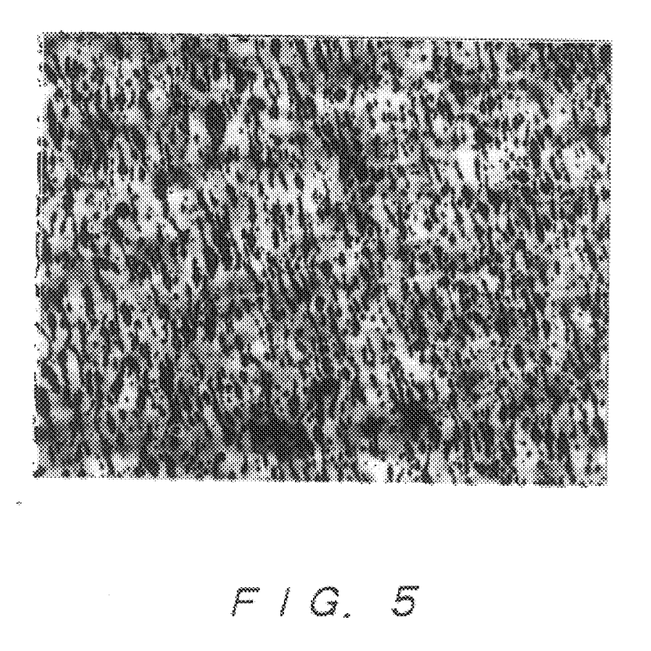
FIG. 5 is an electron microscope photograph (magnification: ×5000) which shows the particle state of copolymer domains along the TD direction in the sheet obtained in Example 7.

*[1]Propylene/ethylene copolymer
*[2]Propylene/ethylene copolymer
*[3]Ratio of MFR = MFR of crystalline PP/MFR of copolymer An electron microscope photograph (magnification: ×5000) of the ultrathin section, used for obtaining the mean dispersed particle diameter and the mean dispersed length the copolymer domains in a cross section along the MD direction of the sheet obtained in Example 7, was shown in FIG. 4. FIG. 4 shows a photograph of the surface cut along the perpendicular direction to the MD direction of the ultrathin section. An electron microscope photograph in the case that the ultrathin section is cut along the perpendicular direction to the TD direction is shown in FIG. 5. FIG. 4 and FIG. 5 show photographs representing particle state of the copolymer domains in the aforementioned sheet along the MD direction and the TD direction, respectively.

As seen from the results shown in Table 2, the sheets of Examples 6–11 have good impact resistance at low temperature, heat resistance and transparency, and also have excellent stress whitening resistance due to bending. Moreover, as seen from FIG. 4 and FIG. 5, the sheet of the present invention has a elongated copolymer domains dispersed finely and uniformly.

On the other hand, in Comparative Examples 4–6, the mean dispersed particle diameter of the propylene-α-olefin copolymer is too large and the aspect ratio is low, so that only a film having poor transparency and stress whitening resistance is obtained. In Comparative Example 7, the proportion of the propylene-α-olefin copolymer to the polypropylene-based resin material is small. Therefore, in Comparative Example 7, only a sheet having insufficient impact resistance at low temperature and stress whitening resistance is obtained.

INDUSTRIAL APPLICABILITY

The unoriented molding of the present invention has excellent impact resistance at low temperature, transparency and heat resistance as well as excellent tear strength and/or stress whitening resistance.

What is claimed is:

1. An unoriented polypropylene-based molding which is a film-shaped or sheet-shaped molding formed from a molding material comprising a polypropylene-based resin material,
   the material comprising 40 to 80% by weight of crystalline polypropylene and 60 to 20% by weight of propylene-α-olefin copolymer containing 20 to 80% by weight of propylene units, the propylene-α-olefin copolymer dispersed as particles in the crystalline polypropylene,
   wherein the particles of the copolymer have an aspect ratio (L/D) of mean dispersed particle length (L) to mean dispersed particle diameter along the thickness of the molding (D) of 30 or more in a cross section of the molding along the MD direction, and the mean dispersed particle diameter of 0.3 μm or less.

2. The unoriented polypropylene-based molding of claim 1, wherein a ratio of MFR of the crystalline polypropylene to that of the propylene-α-olefin copolymer (MFR of the crystalline polypropylene/MFR of the propylene-α-olefin copolymer) is 10 or less.

3. The unoriented polypropylene-based molding of claim 1 or 2, wherein the unoriented molding is an unoriented film having a thickness of 10 to less than 100 μm.

4. The unoriented polypropylene-based molding of claim 1 or 2, wherein the unoriented molding is a sheet having a thickness of 0.1 to 4 mm.

5. The unoriented polypropylene-based molding of claim 1 or 2, wherein the polypropylene-based material is produced by continuous polymerization method.

* * * * *